US010201877B2

(12) United States Patent
Haake

(10) Patent No.: US 10,201,877 B2
(45) Date of Patent: Feb. 12, 2019

(54) PUDDLE FORMING AND SHAPING WITH PRIMARY AND SECONDARY LASERS

(71) Applicant: Titanova Inc, St. Charles, MO (US)

(72) Inventor: John M. Haake, St. Charles, MO (US)

(*) Notice: Subject to any disclaimer, the term of this patent is extended or adjusted under 35 U.S.C. 154(b) by 0 days.

(21) Appl. No.: 13/661,113

(22) Filed: Oct. 26, 2012

(65) Prior Publication Data
US 2013/0105447 A1 May 2, 2013

Related U.S. Application Data

(60) Provisional application No. 61/551,581, filed on Oct. 26, 2011.

(51) Int. Cl.

| | |
|---|---|
| B23K 26/34 | (2014.01) |
| B23K 26/32 | (2014.01) |
| B23K 35/02 | (2006.01) |
| B23K 26/342 | (2014.01) |
| B23K 26/144 | (2014.01) |
| B33Y 30/00 | (2015.01) |
| B23K 103/00 | (2006.01) |

(52) U.S. Cl.
CPC .......... B23K 26/32 (2013.01); B23K 26/144 (2015.10); B23K 26/34 (2013.01); B23K 26/342 (2015.10); B23K 35/0244 (2013.01); B23K 2103/50 (2018.08); B33Y 30/00 (2014.12)

(58) Field of Classification Search
CPC .. B23K 26/0066; B23K 26/03; B23K 26/032; B23K 26/0608; B23K 26/0604; B23K 26/0738; B23K 26/0869; B23K 26/34; B23K 26/345; B23K 26/20; C23C 8/60

USPC .......... 219/121.63, 121.64, 121.76, 121.83, 219/121.65, 121.66, 121.78
See application file for complete search history.

(56) References Cited

U.S. PATENT DOCUMENTS

| | | | | |
|---|---|---|---|---|
| 4,063,105 | A | * 12/1977 | Aggarwal | G02F 1/3534 204/157.22 |
| 4,949,034 | A | * 8/1990 | Imura | G01R 31/308 324/642 |
| 5,705,788 | A | 1/1998 | Beyer et al. | |
| 5,886,313 | A | 3/1999 | Krause et al. | |
| (Continued) | | | | |

OTHER PUBLICATIONS

Schneider, Marcel F.; Laser Cladding with Powder—Ph.D. Thesis; University of Twente, Enschede, The Netherlands; Mar. 1998.
(Continued)

*Primary Examiner* — Dana Ross
*Assistant Examiner* — Kuangyue Chen
(74) *Attorney, Agent, or Firm* — Creativenture Law, LLC; Dennis J M Donahue, III; Kevin C. Staed

(57) ABSTRACT

A material processing system for a base material is provided. The system includes a feeder having a distal end proximate to a surface location of the base material. The feeder supplies a deposit material to the surface location. The deposit material has a width having a first side and a second side. A first laser is directed to the deposit material at the surface location. The first laser is directed across the width from the first side to the second side. A second laser is directed to a desired location within the width. A control system drives the process of cladding the deposit material. The control system includes a shape controller to control the movement of the secondary laser along the deposit material based on feedback from a sensor.

20 Claims, 13 Drawing Sheets

(56) References Cited

U.S. PATENT DOCUMENTS

| | | |
|---|---|---|
| 5,925,271 A | 7/1999 | Pollack et al. |
| 6,013,890 A | 1/2000 | Hulsizer |
| 6,016,227 A | 1/2000 | Hopkins et al. |
| 6,023,043 A | 2/2000 | Manabe et al. |
| 6,046,426 A * | 4/2000 | Jeantette ............. B01F 13/0255 219/121.63 |
| 6,122,564 A | 9/2000 | Koch et al. |
| 6,143,378 A | 11/2000 | Harwell et al. |
| 6,268,584 B1 | 7/2001 | Keicher et al. |
| 6,269,540 B1 | 8/2001 | Islam et al. |
| 6,444,947 B1 | 9/2002 | Bonss et al. |
| 6,526,327 B2 | 2/2003 | Kar et al. |
| 6,534,745 B1 | 3/2003 | Lowney |
| 6,555,780 B1 | 4/2003 | Kim et al. |
| 6,696,664 B2 * | 2/2004 | Pyritz et al. .............. 219/121.64 |
| 6,727,459 B1 | 4/2004 | Bialach |
| 6,838,638 B2 | 1/2005 | Satou et al. |
| 6,861,612 B2 | 3/2005 | Bolton et al. |
| 6,888,090 B2 | 5/2005 | Murphy |
| 6,972,390 B2 * | 12/2005 | Hu ....................... B23K 26/032 148/525 |
| 6,991,150 B2 | 1/2006 | Sato et al. |
| 6,995,334 B1 | 2/2006 | Kovacevic et al. |
| 7,043,330 B2 | 5/2006 | Toyserkani et al. |
| 7,199,330 B2 | 4/2007 | DeMaria et al. |
| 7,400,457 B1 | 7/2008 | Cayer |
| 7,479,616 B2 | 1/2009 | Wang et al. |
| 7,564,006 B2 | 7/2009 | Schwob et al. |
| 7,807,939 B2 | 10/2010 | Nagashima et al. |
| 7,947,922 B2 | 5/2011 | Gross et al. |
| 2003/0042234 A1* | 3/2003 | Suh ....................... C21D 10/005 219/121.76 |
| 2005/0028897 A1* | 2/2005 | Kurz .................. B23K 26/0604 148/525 |
| 2005/0132569 A1 | 6/2005 | Clark et al. |
| 2005/0185235 A1* | 8/2005 | Cannon ................ G02B 26/105 359/204.1 |
| 2006/0006157 A1* | 1/2006 | Oldani ...................... 219/121.64 |
| 2006/0011592 A1 | 1/2006 | Wang et al. |
| 2006/0153996 A1 | 7/2006 | Stanek et al. |
| 2006/0278618 A1* | 12/2006 | Forrest ............... B23K 26/0604 219/121.64 |
| 2007/0164002 A1* | 7/2007 | Scandella et al. ......... 219/76.14 |
| 2010/0044353 A1* | 2/2010 | Olsen ................. B23K 26/0604 219/121.67 |

OTHER PUBLICATIONS

Bachman, Friedrich; Introduction to High Power Diode Laser Technology; Procedings of the Second International WLT-Conference on Lasers in Manufacturing 2003; Munich, Jun. 2003.

* cited by examiner

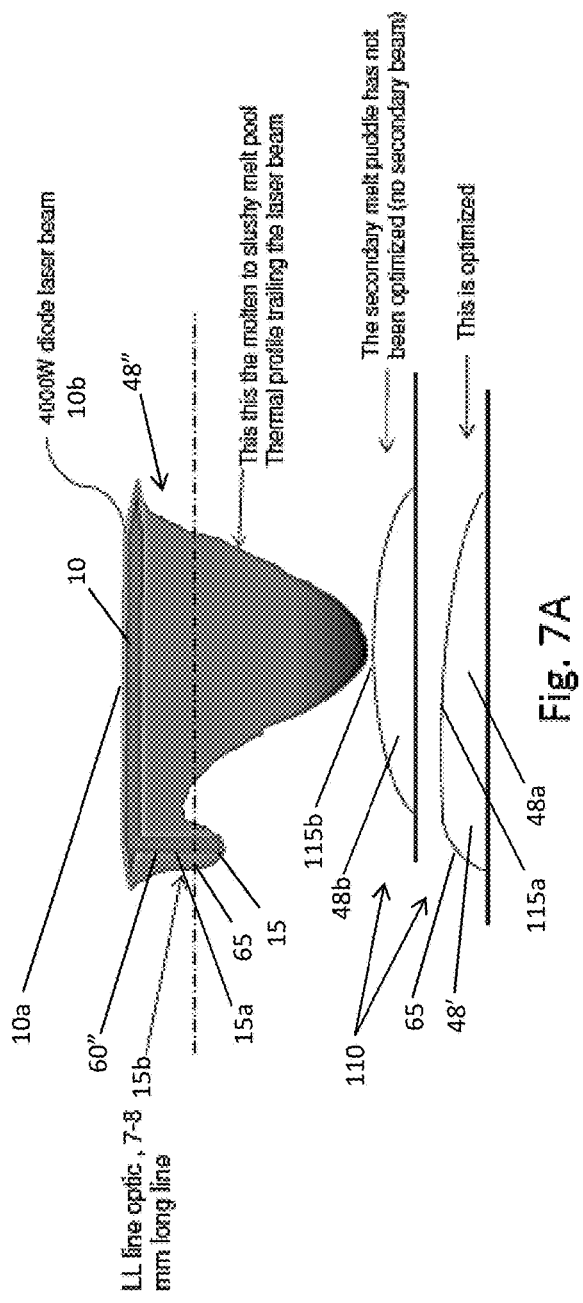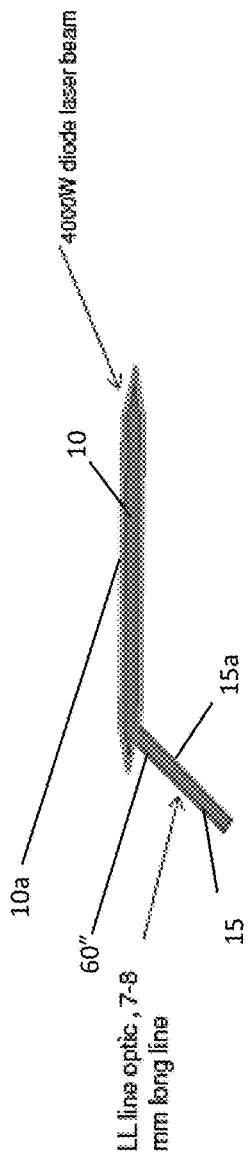
Fig. 7A
Fig. 7B

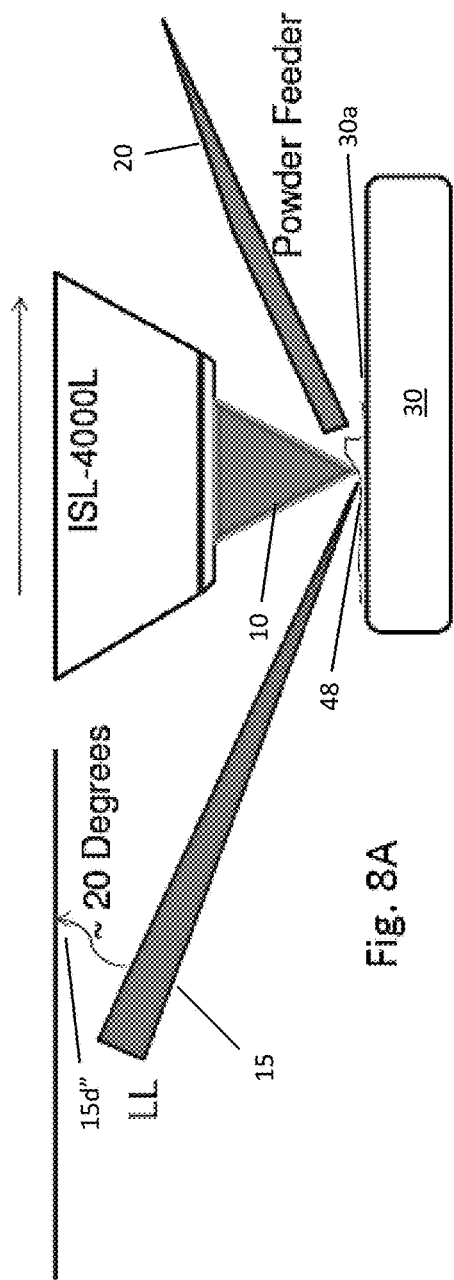
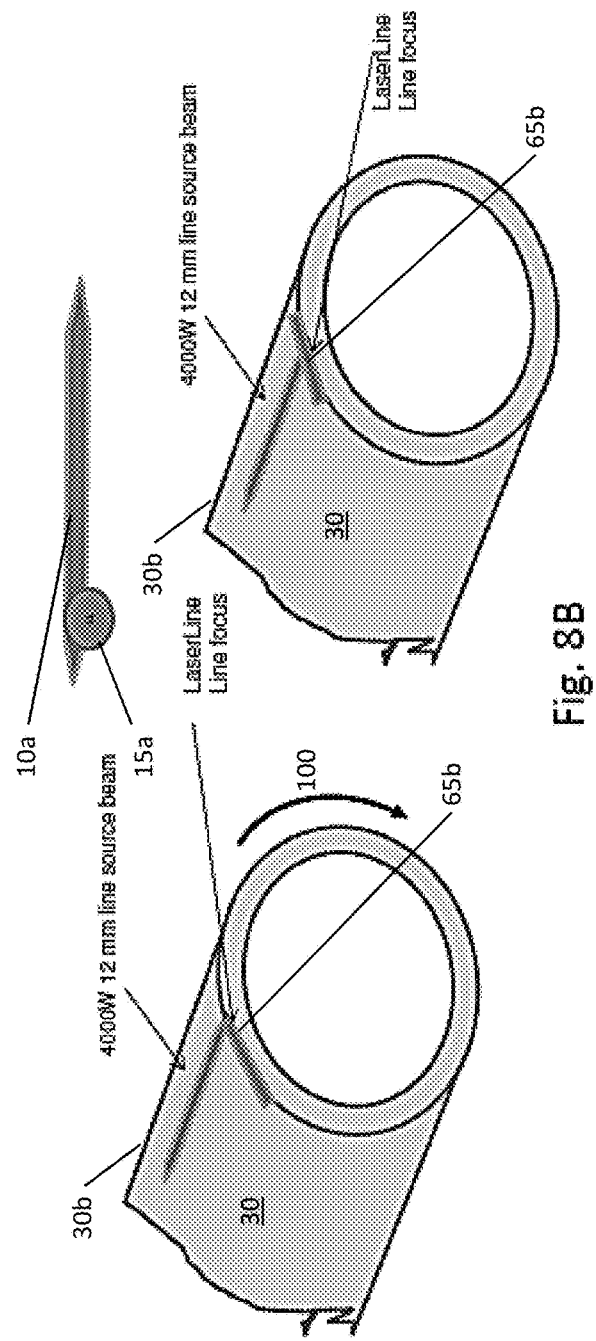
Fig. 8A
Fig. 8B

PUDDLE FORMING AND SHAPING WITH PRIMARY AND SECONDARY LASERS

CROSS-REFERENCE TO RELATED APPLICATIONS

This application claims priority from U.S. Provisional Patent Application No. 61/551,581 filed Oct. 26, 2011 and titled "PUDDLE FORMING AND SHAPING WITH PRIMARY AND SECONDARY LASERS", which is herein incorporated in its entirety.

STATEMENT REGARDING FEDERALLY SPONSORED RESEARCH

The present invention was made with U.S. Government support under a Department of Energy contract, Contract No. DE-FG02-08ER84958, and the government may have certain rights in this invention.

APPENDIX

Not Applicable.

BACKGROUND OF THE INVENTION

Field of the Invention

The present invention relates to welding equipment and processes, and more particularly to laser cladding, also known as laser welding or additive manufacturing of a material that is deposited on a base material.

Related Art

Overlay welding or overlay hard-facing, otherwise known as cladding, involves the deposition of corrosion, erosion or wear resistant materials over a surface of a component to impart the beneficial properties of the cladding materials onto the surface of a metal component or part. The clad material is typically formed as a continuous clad coating of lateral overlapping beads, forming a pore-free, continuous surface of material that increases the thickness of the region. Typically, the cladding process has been performed with arc welding systems for the construction and restoration of a wide variety of metal parts such as tubes, boiler tubes, and vessels, printing rolls, roll dies, engine components such as cranks and cams, agricultural implements such as shovel, knives, and cutters, mining, industrial, and facility equipment such as screws, axels, shafts, oil exploration and down hole components and many more metal components.

For remanufacturing of a worn part, a thin layer of worn-away material is replaced or a thin layer of the beneficial clad material is added to the work piece. The industry is looking for methods of replacing worn-away metal or adding beneficial clad material without changing the part either dimensionally or materially by too much heat. Laser cladding specifically address a need in all these areas by providing a low heat input, thin weld overlay, low dilution cladding. Laser additive manufacturing is a process of making three dimensional solid objects from a digital model, also known as 3D printing. Laser additive manufacturing is achieved using laser cladding as an additive processes, where an object is created by laying down successive layers of material, in this case metal. Laser additive manufacturing uses a high-power laser to fuse metals into 3-dimensional structures. Geometric information may be contained in a computer model to automatically drive the laser additive manufacturing process as it builds up a component layer by layer. Additional software and closed-loop process controls may be used to ensure the geometric and mechanical integrity of the completed part.

Laser cladding is a process in which the heat source is replaced by a laser which can be a $CO_2$, Neodymium:YAG, fiber laser or diode laser. A laser focused as a line source is specifically well suited for wide thin laser cladding and the $CO_2$, Nd:YAG, and fiber laser can be optically transformed to create such a line. Specifically, the diode laser has a naturally occurring spot that is a line with an approximate top hat profile that is very well suited for laser cladding that is preferably thin with low surface roughness and low dilution.

The top hat profile is not the ideal beam to achieve a top hat heating profile. An improved laser beam profile is that which has an intensity power distribution that is more intense at the outer regions. The heating profile also determines the melting profile during cladding. With a perfect top hat beam, the heat will be the greatest in the middle of the beam and taper off isotropically at the edges. This is even more pronounced using a standard Gaussian shaped beam which comes naturally from $CO_2$, fiber coupled Nd:YAG, fiber lasers and diode lasers. Due to surface tension of the melt puddle, material factors, and type of cladding environments, such as cover gas, the resulting clad shape is rounded with a thicker center and tapering toward the ends (a lunular-type shape). This leads to undesirable surface morphology with humping in the middle of the clad track, which subsequently leads to large surface roughness and variable clad thickness during clad overlapping. It is desirable to be able to clad the base material with a uniform cladding material thickness from one clad track to the next. In addition, if the surface is at an edge it is desirable to pull the puddle to the edge without melting the edge. It is also desirable to be able to affect the weld puddle in real time to repair a clad while it is still in a molten or semi-molten state.

In addition, while overlapping a previous clad track previously deposited, clad material is pulled into the subsequent laser puddle due to surface tension leaving less material coverage and/or an undercut at the clad/base interface. Another issue during cladding of a thin layer of dissimilar materials over a base metal is the formation of holes in the clad. Another issue is cladding inside corners with obtuse or acute angle causes the molten puddle to pull to one side or the other.

A need remains for a material processing system that enables control over the melted deposit material.

SUMMARY OF THE INVENTION

A material processing system for a base material is provided. The system includes a feeder having a distal end proximate to a surface location of the base material. The feeder supplies a deposit material to the surface location. The deposit material has a width having a first side and a second side. A first laser is directed to the deposit material at the surface location. The first laser is directed across the width from the first side to the second side. A second laser is directed to a desired location within the width. The deposit material is comprised of a powder, wire or strip. The first laser is comprised of a line source diode laser having a first power level. A second power level of the second laser is less than approximately one fourth of the first power level. A shape controller is connected to the second laser. The shape controller positions the second laser relative to the first side and the second side. The first laser melts the deposit material and the second laser moves the melted deposit material. A beam from the second laser is positioned at least one of before, within, or beyond a beam from the first laser. A beam spot diameter of the beam from the second laser is less than approximately one half a width of the beam from the first laser. In one embodiment, the first laser includes first optics and the second laser includes second optics. The first optics are separate from the second optics.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 7A and 7B are schematic views of alternative secondary laser shapes, the trailing thermal profile and the corresponding melt puddle.

FIG. 8A illustrates a cladding track being laid on a flat surface using an embodiment of the present invention.

FIG. 8B illustrates molten material being pulled over an edge or to an edge using an embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
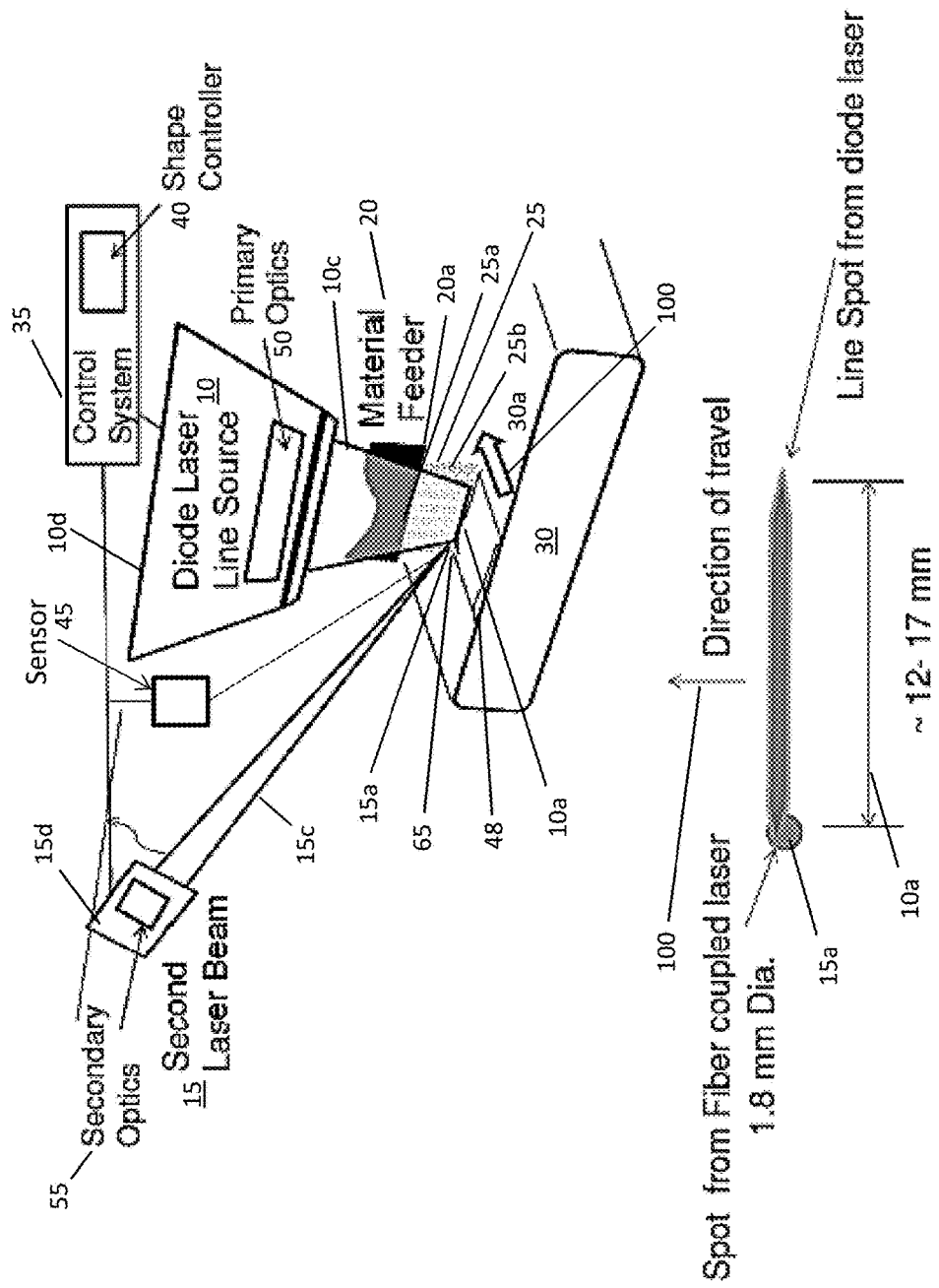
FIG. 1A is a schematic view of a laser system formed in accordance with an embodiment of the invention.
Figure 1B:
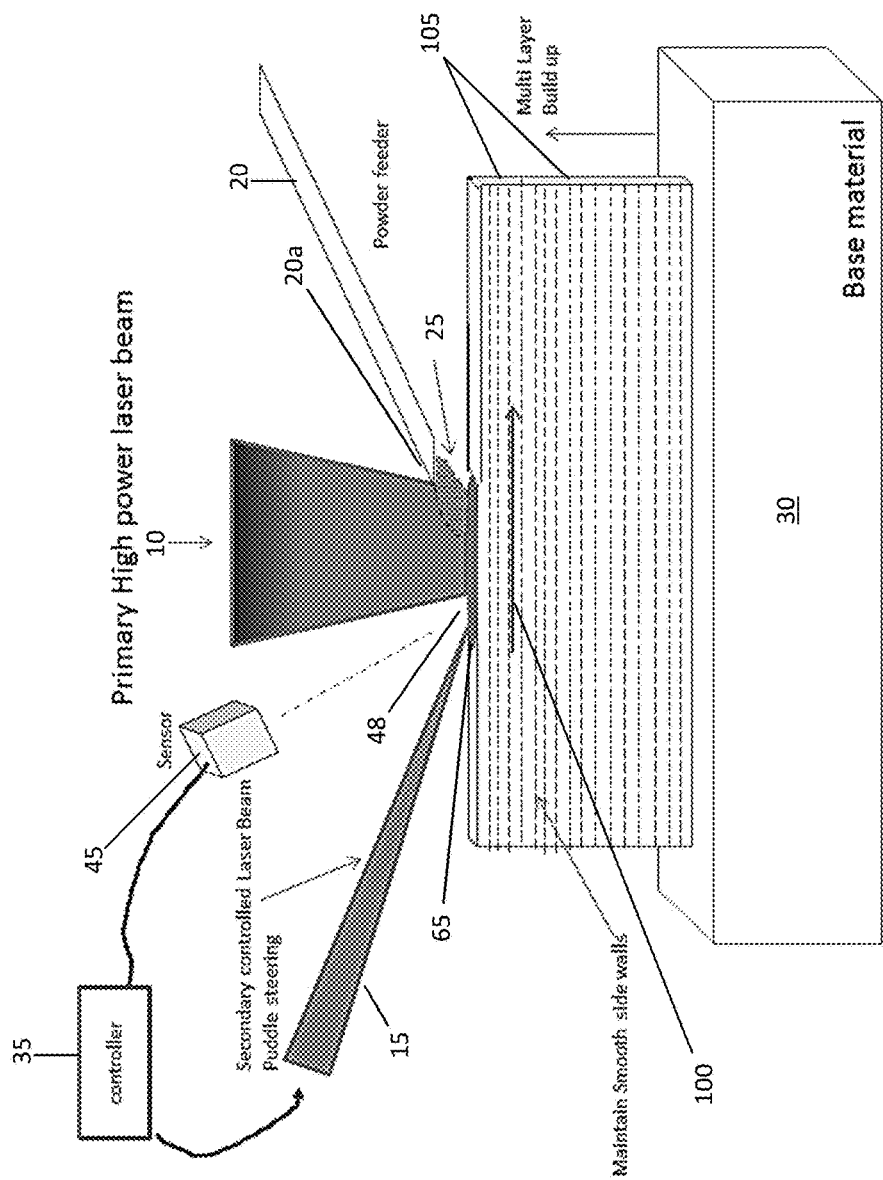
FIG. 1B is a schematic view of laser cladding parallel with a primary laser line and with a secondary laser moving about a long melted pool to create smooth walls.

The present invention improves on welding and cladding techniques using laser systems. Generally, as shown in FIGS. 1A and 1B, the system of the present invention includes a primary line source laser beam, such as diode laser line source 10, a secondary laser beam 15 and a material feeder 20. The material feeder 20 conveys a deposit material 25 to the surface 30a of a base material or work piece 30. In the preferred embodiment, the deposit material 25 is in a powder form 25b, and the distal end 20a of the feeder 20 proximate to the base material 30 defines the width 25a of the deposit material 25 that is supplied to the base material 30. This material 30 can be fed with other means such as cold wire or hot wire feeding, strip feeding, and thermal metal spray techniques. The primary line source laser beam 10 has a width 10a that is approximately equal to the width 25a of the deposit material 25 being supplied by the feeder 20. The secondary laser 15 or lasers 15', 15" targets 15a only a portion 65 of the deposit material 25, such as on one side of the primary laser 10.

A control system 35 drives the cladding process. In particular, the control system 35 includes a shape controller 40 to control the movement 15d" of the secondary laser 15 along a portion 65 of the deposit material 25. Geometric information related to the deposit material 25 may be contained in a computer model to automatically drive the primary laser 10 and the secondary laser 15 as they build the deposit material 25 on the work piece 30 layer by layer. Additional sensor software and closed-loop process controls may be provided within the control system 35 to ensure the geometric and mechanical integrity of the completed part. In particular, at least one sensor 45 monitors the melted deposit material 25 and the geometric and mechanical integrity of the part. The sensor 45 sends feedback to the control system 35 to adjust the position and parameters of the secondary laser 15 to optimize control of the melted deposit material 25 in forming the part. The control system 35 also includes means with which to adjust various parameters of the primary and secondary lasers 10, 15, such as power output 10b, 15b, intensity 10c, 15c, and location 10d, 15d. The primary laser 10 includes primary optics 50 that are separate and independently controlled from secondary optics 55 in the secondary laser 15. The primary and secondary lasers 10, 15 are independently controlled by the control system 35. In one embodiment, the primary and secondary laser 10, 15 may be manually controlled by an operator.

In the embodiment illustrated in FIG. 1B, the system of the present invention may be utilized to provide multi-layer build-up of a part by utilizing laser cladding parallel with the line of the primary laser as the part 30 is moved 100 across the primary laser beam 10. The secondary laser 15 moves about the melted pool of deposit material 25 to maintain the geometric shape of the part. In particular, the secondary laser 15 maintains smooth side walls of the part. Additionally, the secondary laser 15 ensures the mechanical integrity of the part by reducing holes and solidification defects. As described above, the sensor 45 provides feedback to the control system 35 to control the movement and properties of the secondary laser 15 to ensure the geometric shape of the sidewalls and the mechanical integrity of the part as the part is built-up through multiple layers 105.

The selective targeting of the secondary laser 15 to only a portion of the deposit material 25 can change the material properties such as surface tension in the localized area 65. The combined power of the primary and secondary lasers 10, 15 produces a temperature variation in the melt compared with the region with just the primary laser 10. Fluid motion results from surface tension gradient and gravity gradients that are caused by the temperature variations in the melt and produces a stirring motion in the laser cladding puddle 48. The directions of the fluid motion are strongly influenced by the laser beam heating the liquid surface. Accordingly, the addition of the secondary laser 15 to a particular section 65 of material 25 that is melted by the primary laser 10 or line source laser moves or draws or pulls material 110 to a desirable/strategic region 48' of the weld puddle 48 as the deposit material 25 is being laid on the work piece 30. The secondary laser 15 can also be used to keep the deposit material 25 in a molten form for a longer period of time in strategic locations 48'. This is beneficial for removing defects such as holes and solidification defects that would otherwise remain in the clad material after solidification with a single laser system.

According to a particular example of the present invention, the primary line source laser 10 can target a linear beam 60 that is approximately 1 mm-50 mm in length, and the secondary laser 15 can target the deposit material 25 on one side of the primary laser 10 with a beam spot 60' that is approximately 0.1 mm-5 mm in diameter (i.e., on the order of approximately one tenth the length). In one embodiment, the beam from the secondary laser 15 has a diameter that is less than approximately one half of the width of the beam from the primary laser 10. In this arrangement, the secondary laser 15 preferably has a power level 15b less than approximately 25% of the primary laser's 10 power 10b. For example, with a 4,000 Watt primary laser, the secondary laser may have a 400 Watt power level.

Figure 2A:
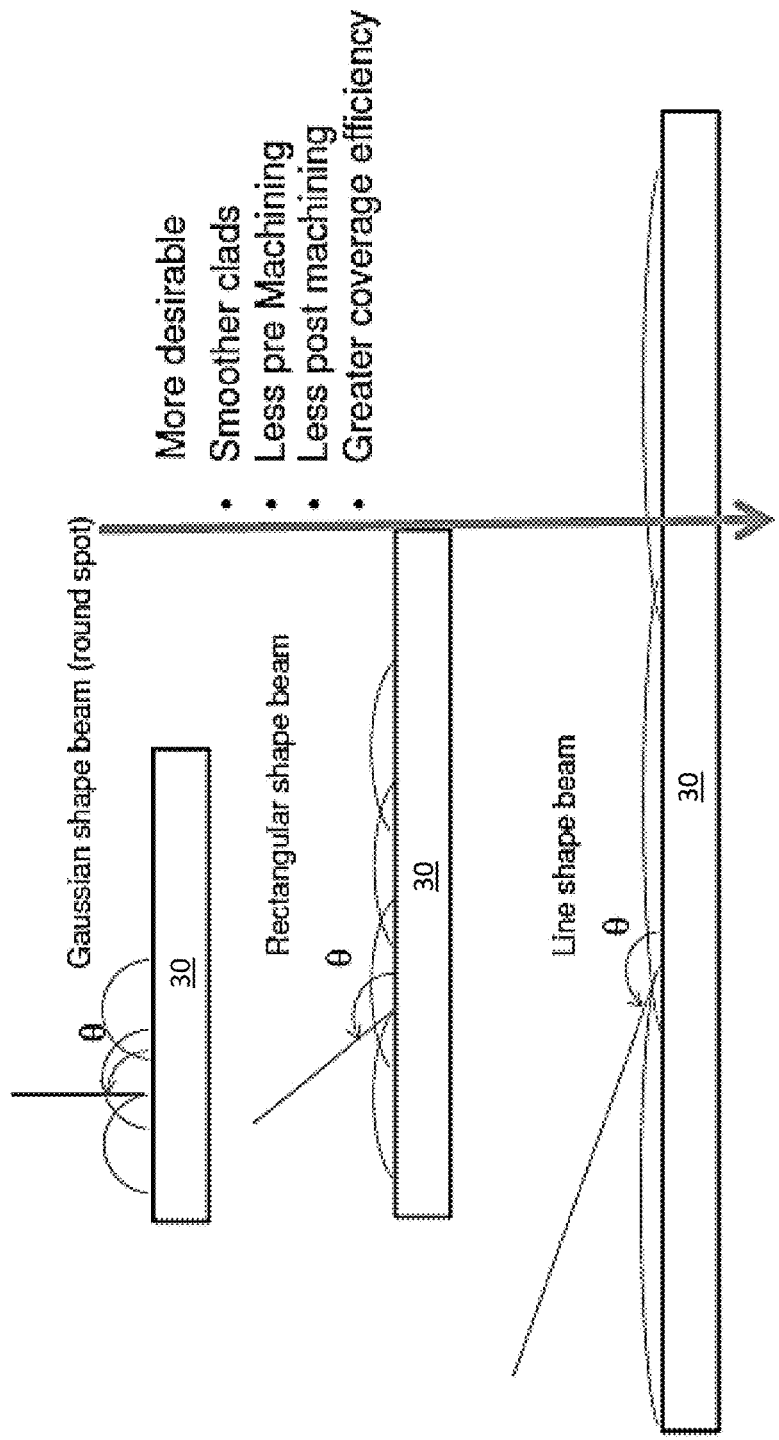
FIGS. 2A and 2B are schematic views of prior art cladding techniques.

The present invention is an improvement over current laser welding and cladding systems that use a single laser. The progressive improvement toward a thinner flatter laser clad (change in wetting angle, θ) is shown in FIG. 2A. As the laser beam goes from round, rectangular and line shaped beams on the work piece for a fixed amount of dilution, the wetting angle θ is improved. The typical clads from the Gaussian beam, rectangular beam and line source are shown on a work piece 30. The shape of the laser beam determines the shape of the welded clad profile and subsequently the amount of overlap required to achieve a smooth track to track ripple free surface and thus require less post-machining to achieve machined surface clean up.

Figure 2B:
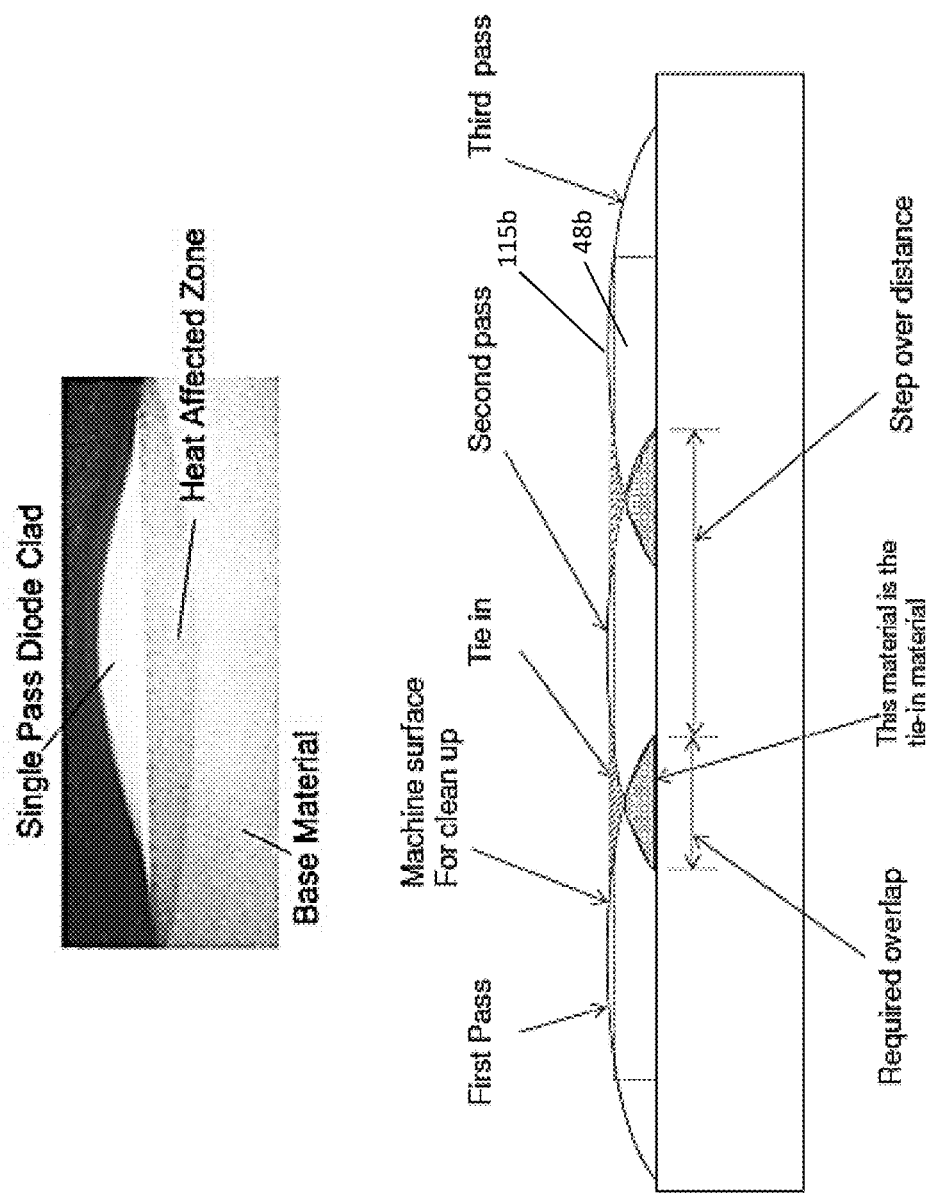
Figure 3:
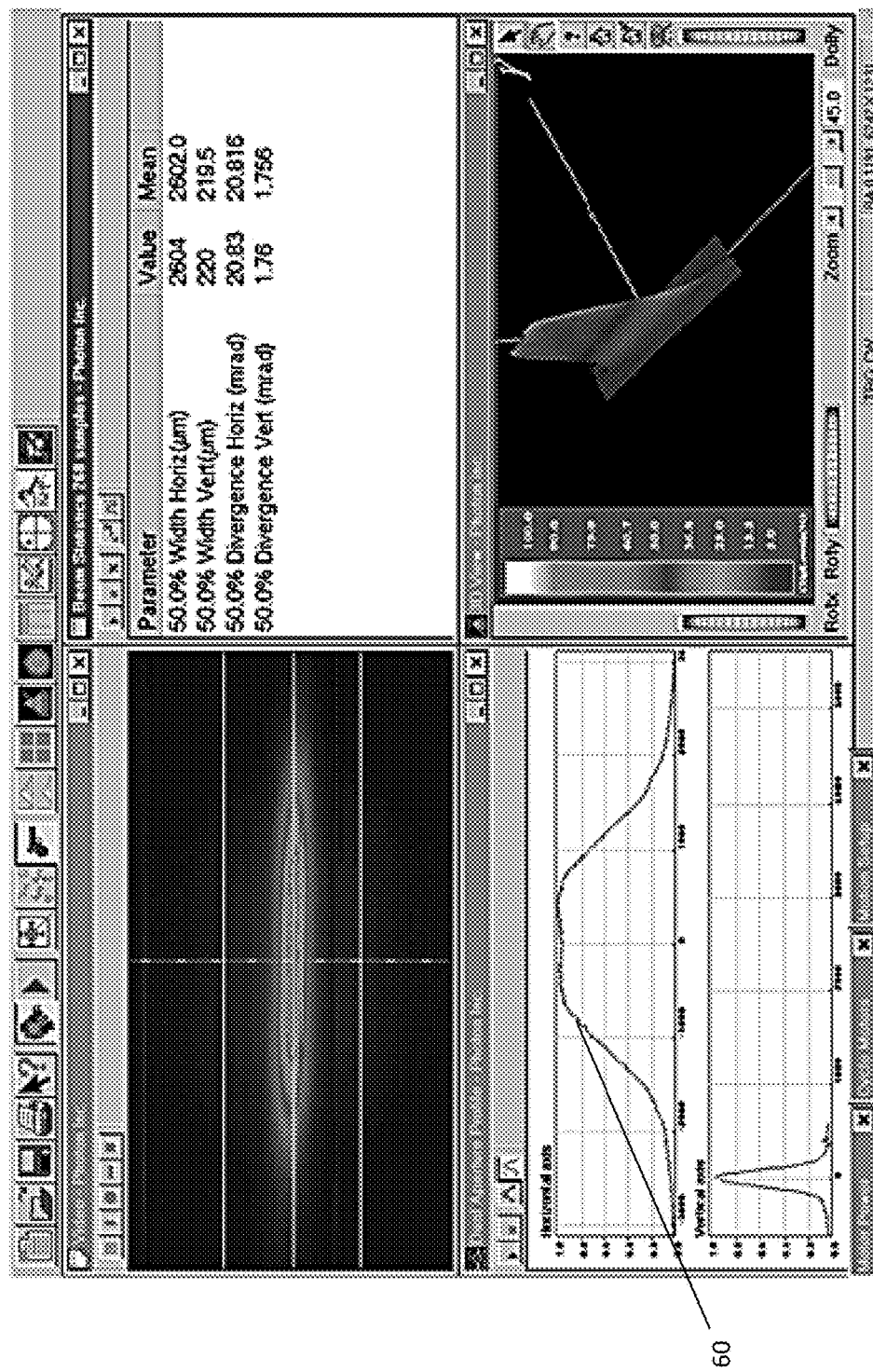
FIG. 3 is a screenshot illustrating graphic representations of a top hat laser beam profile.

As shown in FIG. 2B, even with a line source laser 10 having the top hat profile beam 60 shown in FIG. 3, humping in the middle of the clad 115b leads to undesirable surface morphology, which requires more overlap over subsequent tracks to tie-in to the previous track in order to achieve uniform thickness and a satisfactory clad smoothness with a reduced amount of post machining. These weld parameters are all material and cover gas dependent. The humping in the middle of the track leads to large surface roughness and variability in the clad thickness during clad overlapping. Accordingly, the wider the clad and the larger the wetting angle the easier it will be to tie into the subsequent clad.

However, the disadvantages of the current systems are that they are not flexible enough to cover the whole range of issues associated with high power laser cladding. Most of the other techniques cannot be used with very high power lasers in the extreme high deposition laser cladding environment. The systems which include beam forming optics, whether fixed or adaptable are not amenable to very high powers due to the detrimental effects of thermal and radiative feedback. In addition, the power densities of previously known systems are incompatible with implementing the desired effect. The relationship between the material input, powder feeder and the laser beam that has to be optimized, and modification of the laser beam would create the need to modify the powder feed deposition profile. These modifications would have to be different for different work piece shapes, materials, material purity, preheats, and cover gas type and effectiveness all known to one skilled in the art, thus limiting the utility and ease of use for such systems.

Figure 4:
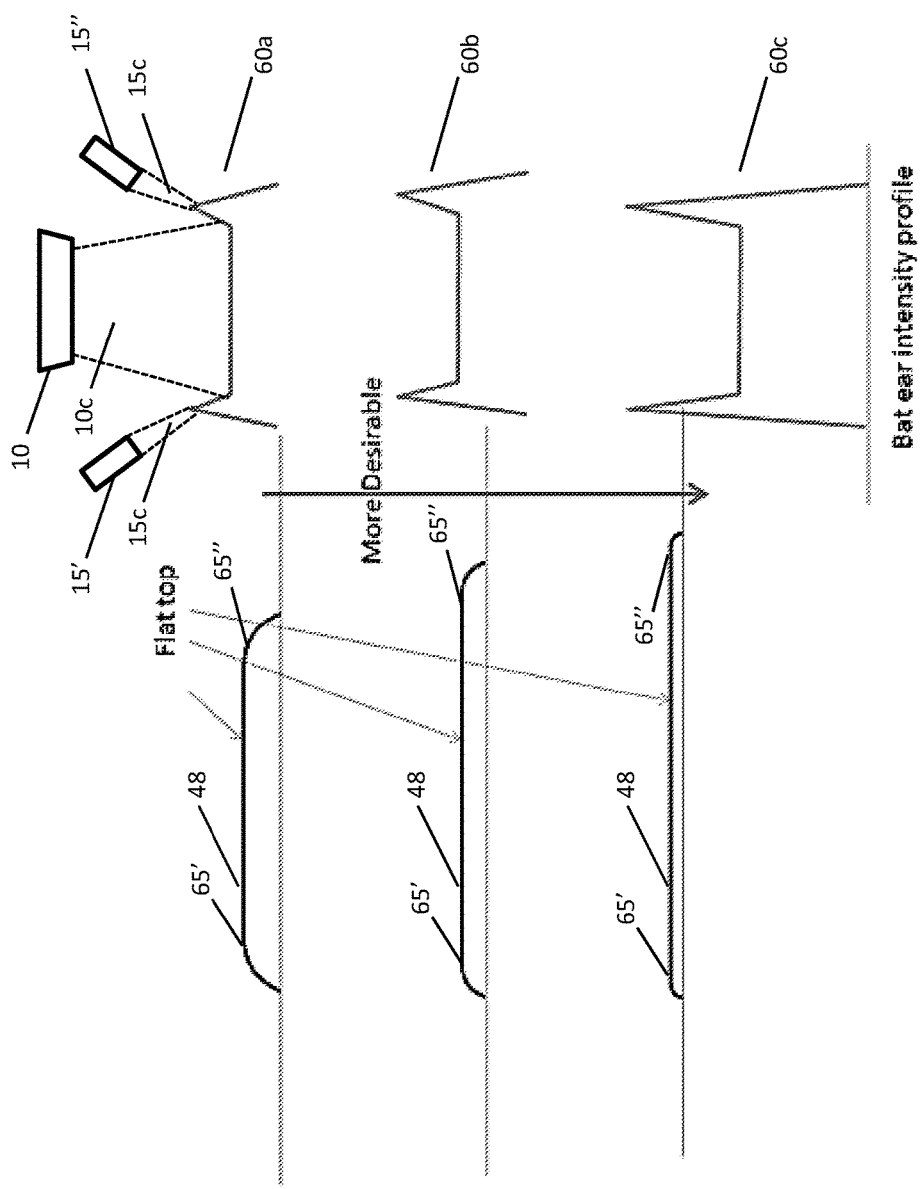
FIG. 4 is a graphic representation of varying edge intensity profiles.
Figure 5:
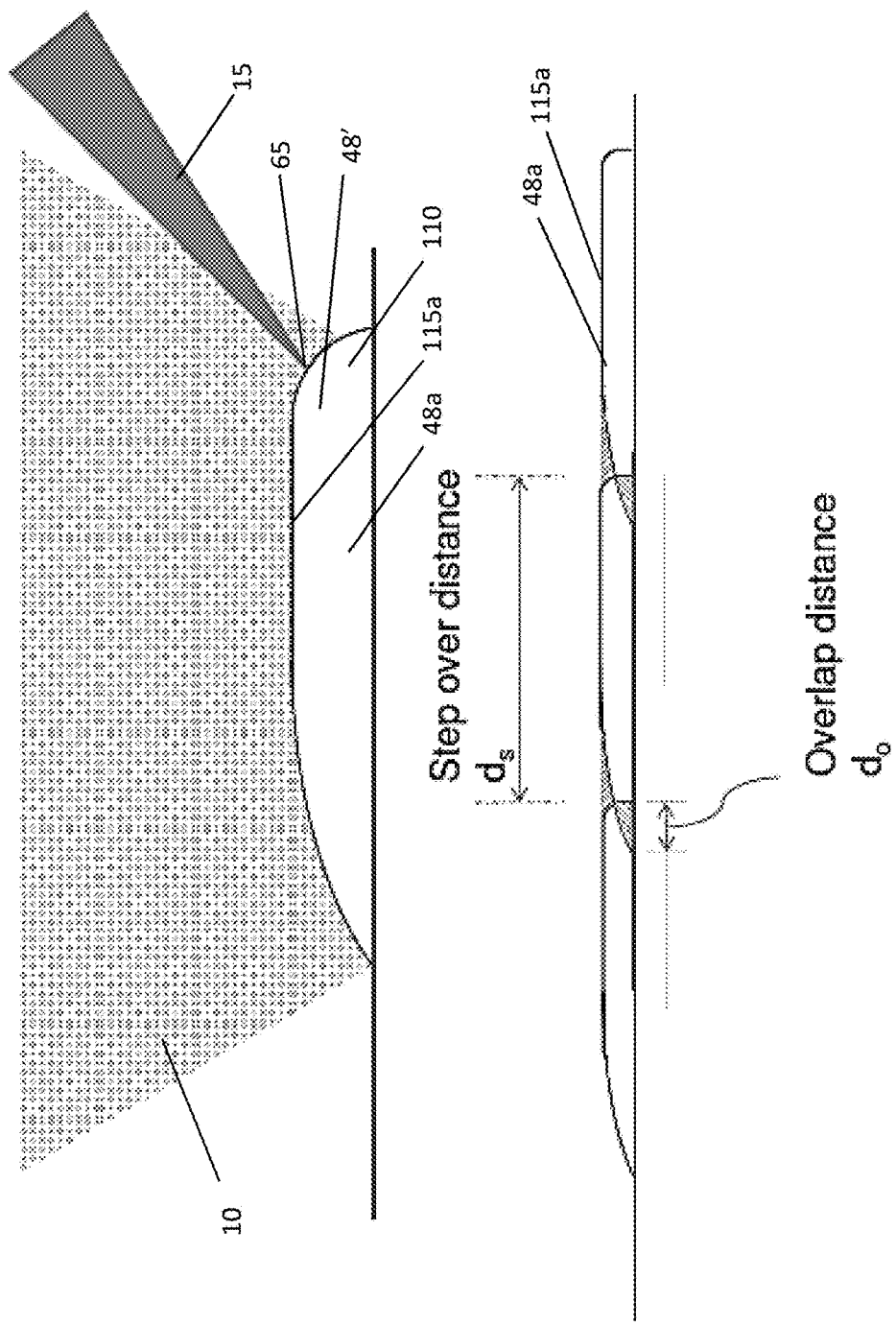
FIG. 5 is a schematic view of the primary and secondary lasers and the cross-sectional shape of the resulting weld puddle.

As shown in FIG. 4, the intensity on the edges of the laser beam may be increased 60a, 60b, 60c to decrease the humping for some clad materials and flatten the top 115a of the clad 48. In prior art systems, such variation in intensity for a singled sourced laser would be produced by the optics, not by multiple independently sourced beams. The present system (FIGS. 1A & 1B) decouples the shaping of the weld puddle 48 by the secondary laser 15 from the energy from the primary laser 20 energy that is required to form the weld puddle 48 with the powder 25 being supplied by the feeder 20. Accordingly, the primary laser 10 is the work horse that melts the deposit material 25, and the second laser 15 influences the already molten puddle 48b into the desired shape 48a as shown in FIGS. 5 and 7A. With the decoupled system of the present invention, the second laser 15 does not have to be directly collinear with the primary laser beam 10, but can be ahead (FIG. 8B), in (FIGS. 1A, 1B, 6, 8A, 9A, 9B), or behind (FIGS. 7A, 7B) the laser beam 10. In addition, the secondary laser 15 doesn't share optics with the primary laser beam 10. Rather, the primary laser 10 includes primary optics 50 that are transformed to focus the primary laser 10 as a line source laser 60. The secondary laser 15 includes secondary optics 55 that are transformed to focus the secondary laser 15 as a line source laser 60", beam spot laser 60', rectangular laser, or any other suitable shape for the application of the secondary laser.

The use of the secondary beam 15 to shape the weld puddle 48 allows for a significant decrease in the overlap distance ($d_o$) compared with the tie-in required by previous systems. As shown in FIG. 5, the shorter overlap distance ($d_o$) allows for a longer step-over distance ($d_s$) which results in improved overlay efficiency. Current single-laser systems may need to overlap 50% of the previous cladding track whereas the present invention significantly reduces the overlap, thereby reducing the overall time to process a given area of base material.

Figure 6:
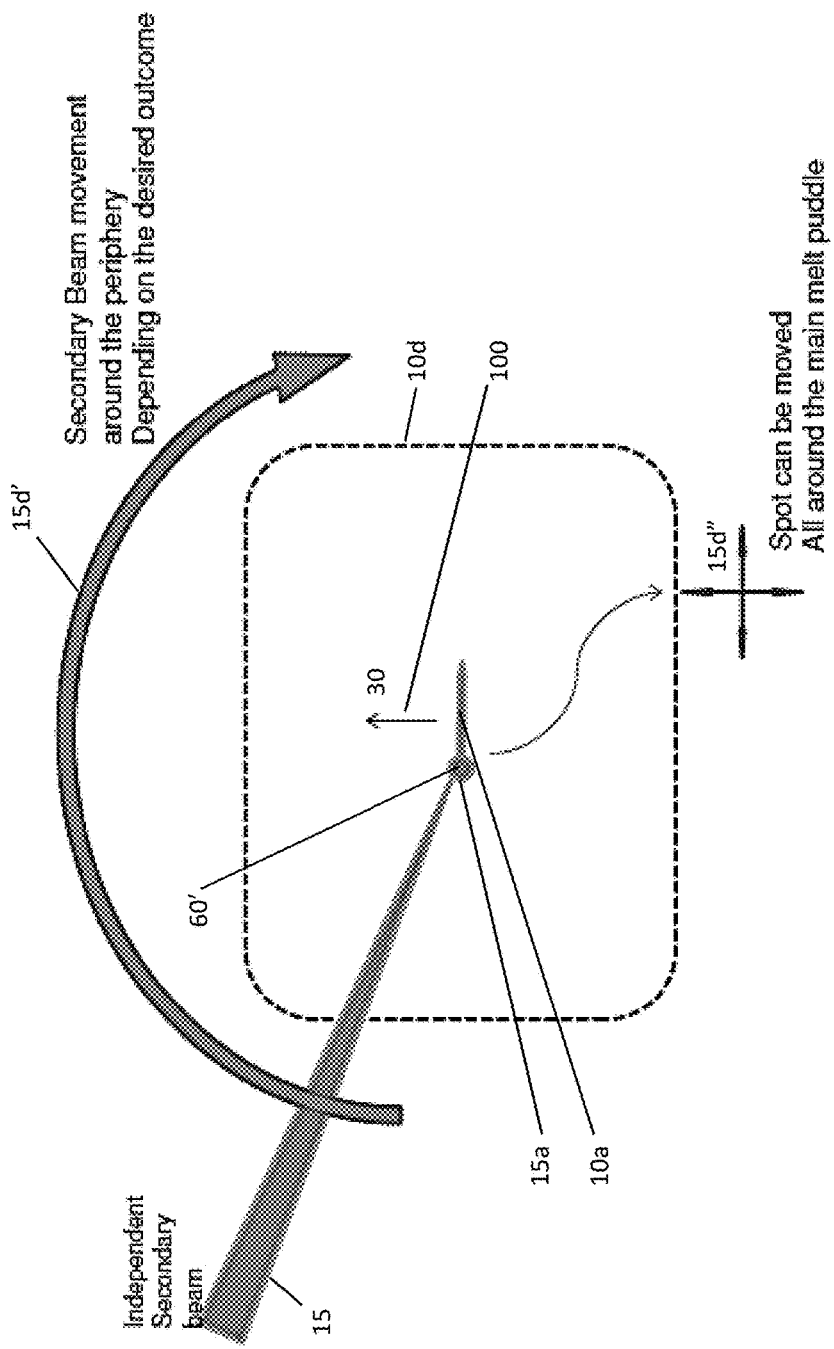
FIG. 6 is a schematic view of the range of motion for the secondary laser around a part being welded.

The decoupling of the secondary beam 15 from the primary beam 10 and the feeder 20 supplying the deposit material 25 allows the high power primary laser 10 to be optimized for the power and energy, as the main melting laser, for the weld metal deposition while also allowing the low power secondary laser 15 to shape and steer 110 the molten puddle 48. The resulting molten puddle 48 can therefore be optimized for improved deposition efficiency, reduced tie-in overlap distance thus reducing the total heat required to get a good smooth clad 48a, thereby reducing process time, pre-machining and post machining requirements. The decoupling of the beams 10, 15 also allows the secondary beam 15 to be positioned 15d around the part 30 being processed, as shown in FIG. 6. The secondary beam 15 can be moved in any position 15d around the main cladding head and can come in at a large degree of angles 15d' about the main cladding laser head 10d or end effector and as discussed in further detail below, the secondary beam's positioning 15a can be also be moved 15d" relative to the main melt puddle 48. This allows ease of implementation and solves the primary problem in a manufacturing environment in which the laser beam has to access a diverse set of surface morphologies 65a found on 3D parts. It will also be appreciated that the secondary beam 15 does not need to be a round spot 60' and may be structured into a line 60" as shown in FIG. 7A. Varying the shape of the secondary beam 15 provides additional flexibility in pulling and steering 110 the molten puddle 48. Additionally, FIG. 7B shows that the various shapes 60', 60" of the secondary beam 15 can be positioned 15a relative to the primary beam which provides even more flexibility in manipulating the molten puddle 48.

Another benefit of decoupling the secondary shaping laser 15 from the primary melting laser 10 is that it allows for greater scalability than is currently available. With current laser welding systems, increasing the power of the primary laser requires a much greater degree of control and monitoring over the system. With the greater the width of the line, the higher powers, larger optics, system complications, and expenses go up exponentially with current laser welding systems. It would desirable to have a line source laser optimized in which the resulting clad has the smallest overlap requirements without adding to system complication and expense. Increased power of the laser can result in more detrimental spurious thermal and radiation effects which lead to overheating and can cause a catastrophic failure of the entire cladding system. Accordingly, increasing the power of the laser in many current systems, which have incorporated beam shaping optics to optimize puddle shape, would require very expensive optics, external cooling and monitoring. Therefore, many current systems, with beam shaping optics, are not scalable to a higher power due to the exorbitant cost associated with the system at high powers and high energy densities.

In comparison, the present invention simplifies the system. By decoupling the secondary laser 15, the primary high power laser 10 is more easily tuned to provide the desired beam shape 60 at the highest possible powers in order to achieve high deposition efficiency while the shaping of the resulting molten puddle 48 by the secondary laser 15, thereby giving the greatest potential to decrease humping and the tie-in overlap area resulting in thin flat clads 48a while also allowing the optimization of edge profiles and fixing unpredictable blow outs and defects.

One of the biggest impediments for the implementation of 3D manufacturing is deposition rate. Current state-of-the-art 3D manufacturing can create 3D metal parts that are very close to form, fit and function, i.e., very high mechanical accuracy, but at the cost of very low additive deposition rates. When the deposition rate is increased, one loses the ability to control the melt puddle shape and thus form, fit and function, thus requiring subsequent machining. The present invention allows dramatically increasing the deposition rate while at the same time controlling the final solidified shape.

Figures 9A, 9B:
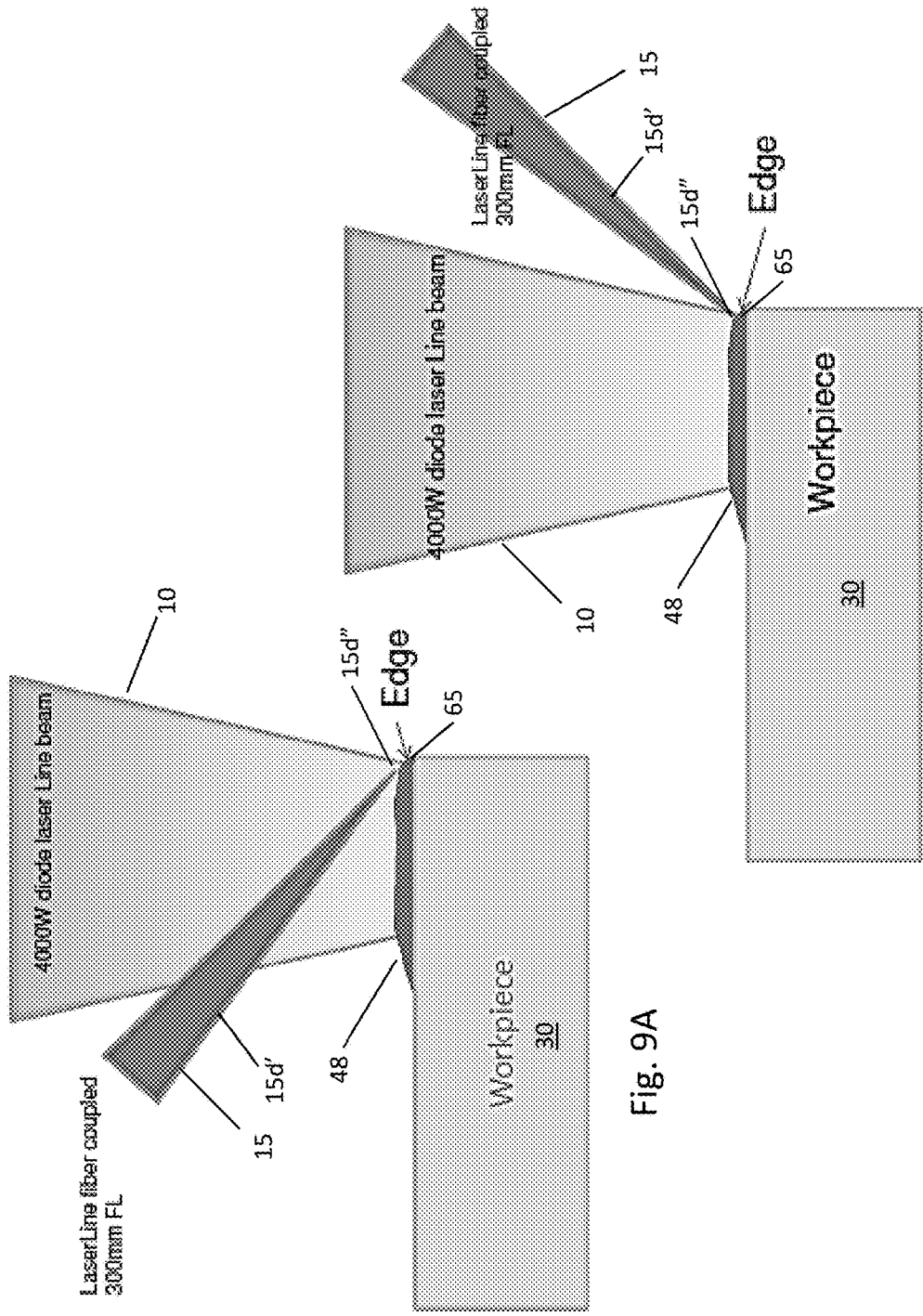
FIGS. 9A and 9B are schematic views of alternative approach angles of the secondary laser.

Examples of the system of the present invention are shown in FIGS. 8-10. In FIG. 8A, a cladding track on a flat surface 30a is being laid using the inventive system. In FIG. 8B, the inventive system is used to pull the molten material over the edge 65b or to an edge, thereby eliminating a two-step process in which the cylindrical body 30b would first be clad and then the edge would need to be built up. The in situ formation of the cladding all the way to the edge is a more efficient process that reduces costs. The alternative arrangements of the secondary laser 15 in FIGS. 9A and 9B show that the secondary laser 15 is insensitive to the approach angle 15d'. Accordingly, the molten puddle 48 can be shaped from a variety of perspectives 15d' and locations 15d". The variation in the location 15d of the secondary laser 15 adds to the total flexibility of the present system because it allows the arrangement of the design to be varied to avoid interference with the work piece 30 or other equipment that could otherwise be an obstruction.

Based on the description and examples above, it will be appreciated that the present invention provides an advantage over the currently known systems by being able to shape 110 the puddle 48 such that the bead of the final solidified bead is improved on flat areas, on edges, inside corners, and holes, and is amenable to tie-in to subsequent laser cladding tracks. The shape control is achieved by one or more additional laser beams that are strategically placed in locations to pull 110 the weld puddle 48 by either affecting surface tension or keeping the material molten for a longer period of time. The shape control can also be used to steer the weld puddle 48 around a hole or to repair holes or blow outs during cladding.

Figure 10A:
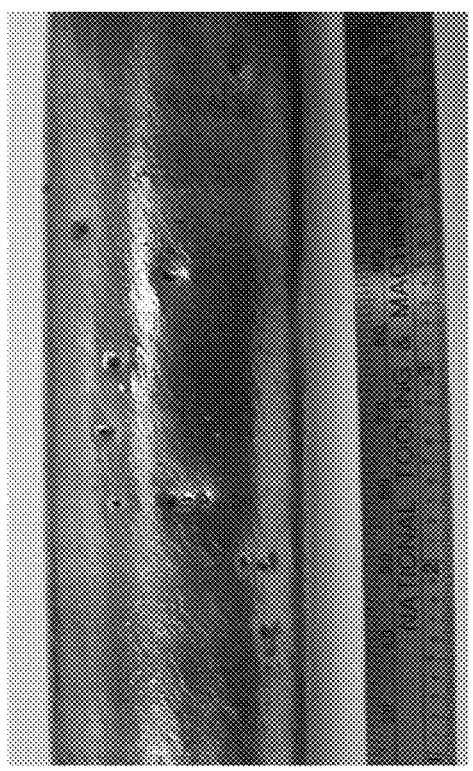
FIGS. 10A-10C illustrate parts that have been welded using various techniques.
Figure 10C:
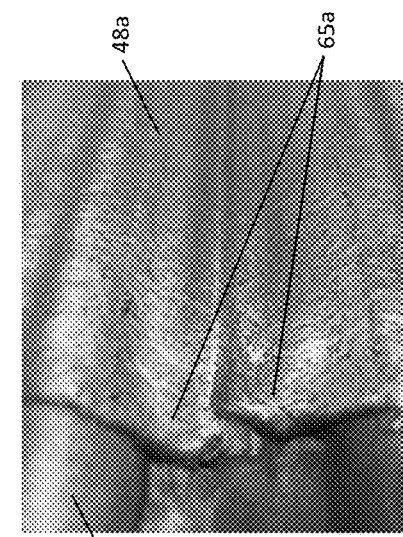
Figure 10B:
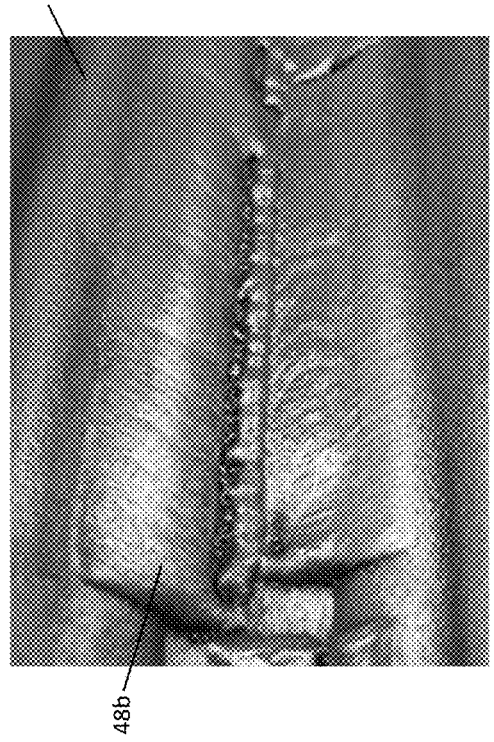

This same surface tension, which drives the convection vortex currents, is also responsible for the surface profile, ripples, and defects which are frozen "in-place" due to the rapid solidification inherent in laser cladding. Accordingly, the in-situ control of the molten puddle 48 can also be used to resolve other issues with laser welding and cladding, as shown in FIGS. 10A-10C. While the puddle 48 remains in its molten state, the secondary laser 15 can be used to reduce pinholes that result from frozen "in-place" explosions (rapid out gassing of pores and exothermic reactions). In addition, non-flat geometries of a work piece 30, such as waterwall panels which are of non-flat non-cylindrical geometry 30c, and out of position welds such as 5 G welds, will heavily influence the shape of the puddle 48. As is well known, a 1G [groove] weld is different from a 1F [fillet] weld primarily due to the influence of the shape of the base and the orientation of the base with respect to gravity force vector, whereas a single laser system would result in less than optimal results 48b for such curved shapes (FIG. 10B), the primary and secondary lasers 10, 15 of the present invention can work together to optimize 65a a cladding 48a of work pieces with curved geometries (FIG. 10C).

The puddle steering 110 is achieved by changing the surface tension on the surface of the puddle 48 in strategic locations 65', 65", thus affecting the puddle shape 48a, 48b and subsequent thickness by illuminating these locations with one or more secondary laser beams 15', 15". As particularly shown in FIG. 7A, the melt puddle 48 has a thermal profile region 48" trailing the primary beam 10 along its width 10a in a molten to slushy melt pool. As indicated above, the secondary laser beam 15 is directed to the strategic location 65 of the deposit material 25 which is in the thermal profile region 48" of the melt puddle 48. As also indicated above, the secondary laser 15 can change the surface tension and can keep the material molten for a longer period of time in the strategic location 65 which produces the optimized puddle shape 48a with a flat top 115a instead of the standard shape 48b with the lunular-type humping 115b. These secondary laser beams 15 preferably use much less power than the primary laser beams. To produce the puddle steering, the secondary laser beams 15 may have less than 25% of the primary laser's power level. Secondary laser power levels may even be in the range of 5% or 10% of the primary laser's power. These laser beams are such that they are of different geometries depending on the application, i.e., line, spot, or rectangular in shape. It will also be appreciated that beam scanning optics can be employed to rapidly move the secondary beam 15 in order to fix holes and blow outs and also scan around small holes.

The base material 30 can be flat 30a, circular 30b or complex shapes 30c. The shape, quality and deposition rates of the cladding or weld overlay are enhanced as a result of the system's structural and control features of the present invention. The base material can be out of position as that described by the weld positions 2G, 2F, 3G, 3F, 4F, 4G, 5F, 5G, 6G, and any other position as known by one skilled in the art of welding.

Features and benefits of the present invention are listed below. Two or more lasers are used with one being a primary laser 10 for melting the deposit material and another laser being secondary 15 with lower power for shaping the molten puddle 48. The secondary laser beam 15 does not have to be collinear with or in the same optical train as the primary laser 10. The secondary laser beam 15 is independent of the material feeding mechanism 20. The second laser beam 15 is used to affect the final puddle shape such that the clads are tied in together more efficiently. The inventive system relates to increasing the deposition efficiency by affecting the clad morphology. The inventive system relates to decreased dilution while at the same time achieving good surface morphology. The inventive system enables controlling the final solidified shape after the material 25 is initially melted, i.e., outside the main radiation area. The inventive system enables the modification of clad morphology 65 during 3D build up. The inventive system will help reduce the side wall defect the amount of machining time required to achieve part clean up. The inventive system enables edge build out simultaneously with line source laser cladding. The inventive system reduces solidification cracking. The inventive system controls the shape of the weld puddle around different work piece geometries, such as edges, holes, inside corners and outside corners.

Figure 11:
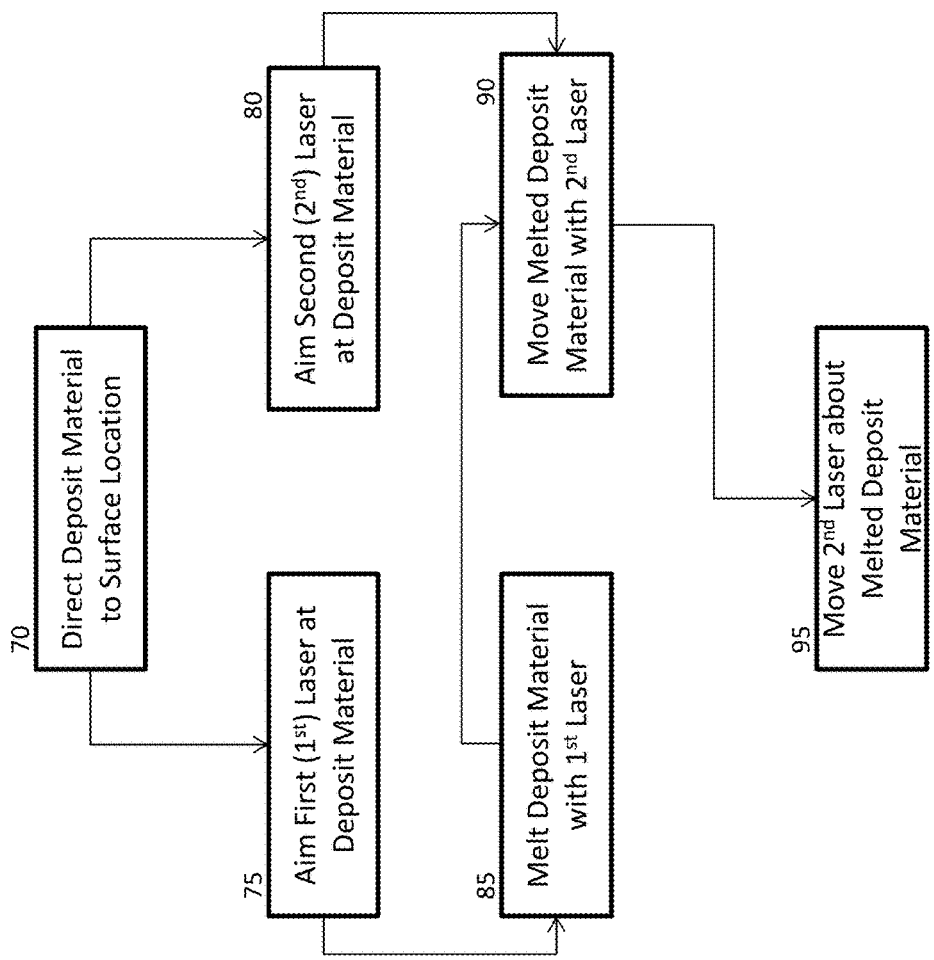
FIG. 11 is a flowchart of a method of additive manufacturing in accordance with an embodiment of the present invention.

FIG. 11 illustrates a method for utilizing the system described herein. The method includes directing a deposit material through a feeder to a surface location proximate to the base material 70. The deposit material may be directed from at least one of a wire feed or a hot wire feed. The deposit material directed by the feeder has a width with a first side and a second side. A first laser is aimed at the deposit material at the surface location 75. The first laser has a beam width extending substantially across the first side to the second side. A second laser is directed toward a selected location between the first side and the second side, wherein the selected location is inclusive of the first side and the second side. The second laser is positioned at the selected location with a shape controller and may be positioned before, within, or beyond a beam from the first laser. The method also includes melting the deposit material with the first laser 85 and moving the melted deposit material with the second laser 90, and the second laser can be moved about the melted deposit material 95. The second laser has a power level less than approximately one fourth of a power level of the first laser. Additionally, a beam spot diameter of a beam from the second laser is less than approximately one half a width of a beam from the first laser.

The present invention provides and/or improves upon deposition rate by maximizing deposition rate without sacrificing clad morphologies, in situ defect mitigation (fixing blow holes), edge definition, edge definition around holes, inside fillet definition, lowering dilution, thinner clads, improved cladding morphology (flatter, thinner clads), control of solidification cracking issues, improved wire feed laser cladding, improved 3D laser additive manufacturing.

The present invention, by decoupling the puddle shaping produced by the low-power secondary laser from the melting of the deposit material by the "workhorse" high-power primary laser, is significantly different from prior systems which would try to use a single laser beam and shape the beam using optics. The present system is also different from arc weld systems that use multiple arcs, with one arc used in the heating process when the deposit materials are first supplied to the surface followed by a second arc to smooth out the overlay. In comparison, the primary and secondary lasers of the present invention are preferably used in combination with each other on the weld puddle 48 as described above. Another known system that is different from the present invention uses a magnetic field to influence the puddle shape.

The present invention improves the clad profile in a way that increases the clad deposition efficiency without adding complexity to the main laser cladding head. The present invention provides flexibility in position 15$d$, power 15$b$, beam shape 60$a$, 60$b$, 60$c$, 60', 60", and temporal coherence (resolution or constructions) while reducing the complexity of the system and reducing the cost of implementation. All of this is done without compromising the robustness of the primary laser because the secondary laser is decoupled. It will also be appreciated that the present invention can be used under a wide range of process material weld properties, cover gas, base material and other welding essential variables.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A material processing system for a base material comprising:
   a feeder having a distal end proximate to a surface location of the base material, wherein said feeder supplies a deposit material to said surface location at a material feed location, said deposit material having a material width having a first material side and a second material side, wherein at least one of the base material and said feeder moves relative to the other along a direction of travel;
   a primary laser directed to and focused on said deposit material at said surface location, wherein said primary laser has a first beam having a first beam width approximately equal to said material width with a first side and a second side, and wherein said primary laser melts said deposit material into a melt puddle along said direction of travel, wherein said melt puddle comprises a pair of sides between a puddle width corresponding with said first side and said second side and with said first material side and said second material side of said deposit material, a shape between said pair of sides, and a trailing melt pool extending behind said material feed location between said pair of sides as the base material and said feeder move relative to each other along said direction of travel; and
   a secondary laser directed to and focused onto only said first side of said first beam, wherein said first side corresponds to a localized area of said melt puddle within said puddle width and only on a targeted side of said pair of sides, wherein said secondary laser has a second beam with a second beam width less than one half of said first beam width, wherein a portion of said second beam width is within said first beam width at said first side at said surface location, and wherein said secondary laser changes said shape of said melt puddle in at least said localized area.

2. The material processing system of claim 1, wherein said second beam width of said second beam is directed to and focused on said localized area on said targeted side and not on another of said pair of sides opposite from said targeted side, wherein said second beam of said secondary laser is not collinear with said first beam of said primary laser along said direction of travel, wherein said primary laser has a first power level, and wherein a second power level of said secondary laser is less than approximately one fourth of said first power level.

3. The material processing system of claim 1 further comprising a control system, a sensor and a shape controller, wherein said control system drives said primary laser and controls said primary laser independently from said secondary laser, wherein said shape controller is connected to said secondary laser, wherein said sensor monitors at least one of said deposit material and said melt puddle, and wherein said shape controller positions said secondary laser relative to said targeted side based on feedback from said sensor.

4. The material processing system of claim 1, wherein said second beam width has a minimum second beam width and a maximum second beam width, wherein said maximum second beam width is less than one half said first beam width, wherein said secondary laser produces a fluid motion of molten material within said melt puddle at said localized area, wherein said fluid motion changes said shape of said melt puddle from a first shape to a second shape.

5. The material processing system of claim 1, wherein said first beam width is greater than five times said second beam width, wherein said first shape of said melt puddle is a middle hump shape, and wherein said second shape of said melt puddle is a flattened top shape.

6. The material processing system of claim 1, further comprising another secondary laser directed to and focused on a second localized area at a second targeted side at an opposite side of said melt puddle from said targeted side for said localized area of said secondary laser.

7. The material processing system of claim 1, wherein said second beam width of said secondary laser is less than one tenth of said first beam width of said primary laser.

8. A material processing system for additive manufacturing on a base material with a deposit material, comprising:
a feeder adapted to supply the deposit material at a material feed location on the base material, wherein at least one of the base material and the feeder moves relative to the other along a direction of travel;
a first laser having a first beam aimed toward and focused on the deposit material at said material feed location, wherein said first laser travels along said direction of travel with said feeder, wherein said first laser has a first power level, wherein said first beam has a first side and a second side and a first beam width between said first side and said second side, and wherein said first laser melts said deposit material into a molten state between said first side and said second side;
a melt puddle formed by said molten state of said deposit material at said material feed location between said first side and said second side of said first beam and by a trailing melt pool extending behind said material feed location between said first side and said second side as the base material and said feeder move relative to each other along said direction of travel, wherein said melt puddle has a pair of sides corresponding to said first side and said second side of said first beam at said material feed location, and wherein said first beam produces a first puddle shape for said melt puddle between said pair of sides; and
a second laser directed to and focused on only said first side of said first beam at said material feed location corresponding with a localized area of said melt puddle at said first side, wherein said second laser has a second power level less than approximately one fourth of said first power level, wherein said second laser has a second beam with a second beam width less than one half of said first beam width, and wherein said second laser produces a second puddle shape in at least said localized area of said melt puddle.

9. The material processing system of claim 8 further comprising a control system, a sensor and a shape controller, wherein said control system drives said first laser and controls said first laser independently from said second laser, wherein said shape controller is connected to said second laser, wherein said sensor monitors the deposit material, wherein said second beam of said secondary laser is not collinear with said first beam of said primary laser along said direction of travel, wherein said second beam width has a minimum second beam width and a maximum second beam width, wherein said maximum second beam width is less than one half said first beam width, and wherein said shape controller positions said second laser relative to said first side based on feedback from said sensor.

10. The material processing system of claim 8, wherein said first puddle shape is a middle hump shape, wherein said second puddle shape is a flattened top shape, wherein said second beam width extends back from said first side of said first beam and away from said direction of travel, and wherein said first beam width is greater than five times said second beam width.

11. A material processing system for a base material on which a deposit material is supplied by a feeder, comprising:
a material feed location for the deposit material on the base material, wherein at least one of the base material and the feeder moves relative to the other;
a first laser having a first beam aimed toward and focused on the deposit material at the material feed location, wherein the first laser has a first power level and the first beam has a first side and a second side with a first beam width between the first side and the second side, wherein the first laser melts the deposit material disposed at the material feed location into a melt puddle, wherein the melt puddle has a pair of sides corresponding with the first side and the second side of the first beam and has a trailing melt pool extending behind the material feed location between the pair of sides as the base material and the feeder move relative to each other; and
a second laser having a second beam directed to and focused onto a location proximate to only one of the first side and the second side of the first laser beam, wherein the location is a localized area of the melt puddle between the pair of sides, wherein the second laser has a second power level less than approximately one fourth of the first power level, and wherein the second laser has a second beam width less than one half of the first beam width.

12. The material processing system of claim 11, wherein the first laser melts the deposit material into a molten state having a first shape between the first side and the second side of the first beam at the material feed location, wherein the second laser produces a movement in the melt puddle in at least the localized area, wherein the movement in the melt puddle changes a shape of the melt puddle between the pair of sides from the first shape to a second shape wherein said second beam width has a minimum second beam width and a maximum second beam width, and wherein said maximum second beam width is less than one half said first beam width.

13. The material processing system of claim 11, wherein the first shape is a middle hump shape and the second shape is a flattened top shape, and wherein the first beam width is greater than ten times the second beam width.

14. The material processing system of claim 11, wherein the first beam width is greater than five times the second beam width.

15. The material processing system of claim 11, further comprising a control system, a sensor and a shape controller, wherein the control system drives the first laser and controls the first laser independently from the second laser, wherein the shape controller is connected to the second laser, wherein the sensor monitors at least one of the deposit material and the melt puddle, and wherein the shape controller positions the second beam relative to the first side and the second side based on feedback from the sensor.

16. The material processing system of claim 11, wherein the second beam of the second laser is directed to and focused on the location proximate to the first side of the first laser and is not directed to or focused on the second side of the first laser.

17. A material processing system for additive manufacturing on a base material with a deposit material, comprising:
- a feeder adapted to supply the deposit material at a material feed location on the base material, wherein at least one of the base material and the feeder moves relative to the other;
- a first laser having a first beam aimed toward and focused on the deposit material at the material feed location, wherein the first laser has a first power level and the first beam has a first side and a second side with a first beam width between the first side and the second side, wherein the first laser melts the deposit material disposed at the material feed location into a melt puddle, wherein the melt puddle is comprised of a pair of sides corresponding with the first side and the second side of the first beam, a first shape between the pair of sides, and a trailing melt pool spanning between the pair of sides and extending behind the first beam and material feed location as the base material and the feeder move relative to each other; and
- a second laser having a second beam directed to and focused onto only the first side of the first beam and not directed to or focused onto the second side of the first beam, wherein the second laser has a second power level less than approximately one fourth of the first power level, wherein the second laser has a second beam width less than one half of the first beam width, and wherein the second laser produces a second shape for the melt puddle different from the first shape in at least in the localized area.

18. The material processing system of claim 17, wherein the first shape is a middle hump shape and the second shape is a flattened top shape, and wherein the first beam width is greater than ten times the second beam width.

19. The material processing system of claim 17, further comprising a control system, a sensor and a shape controller, wherein the control system drives the first laser and controls the first laser independently from the second laser, wherein the shape controller is connected to the second laser, wherein the sensor monitors at least one of the deposit material and the melt puddle, wherein the shape controller positions the second beam based on feedback from the sensor, wherein said second beam width has a minimum second beam width and a maximum second beam width, wherein said maximum second beam width is less than one half said first beam width, and wherein the second beam is positioned relative to the first side of the first beam.

20. The material processing system of claim 1, wherein said second beam width extends back from said first side of said first beam and away from said direction of travel.

* * * * *